G. P. CLAPP.
NAIL-PLATE CUTTER.
No. 180,324. Patented July 25, 1876.
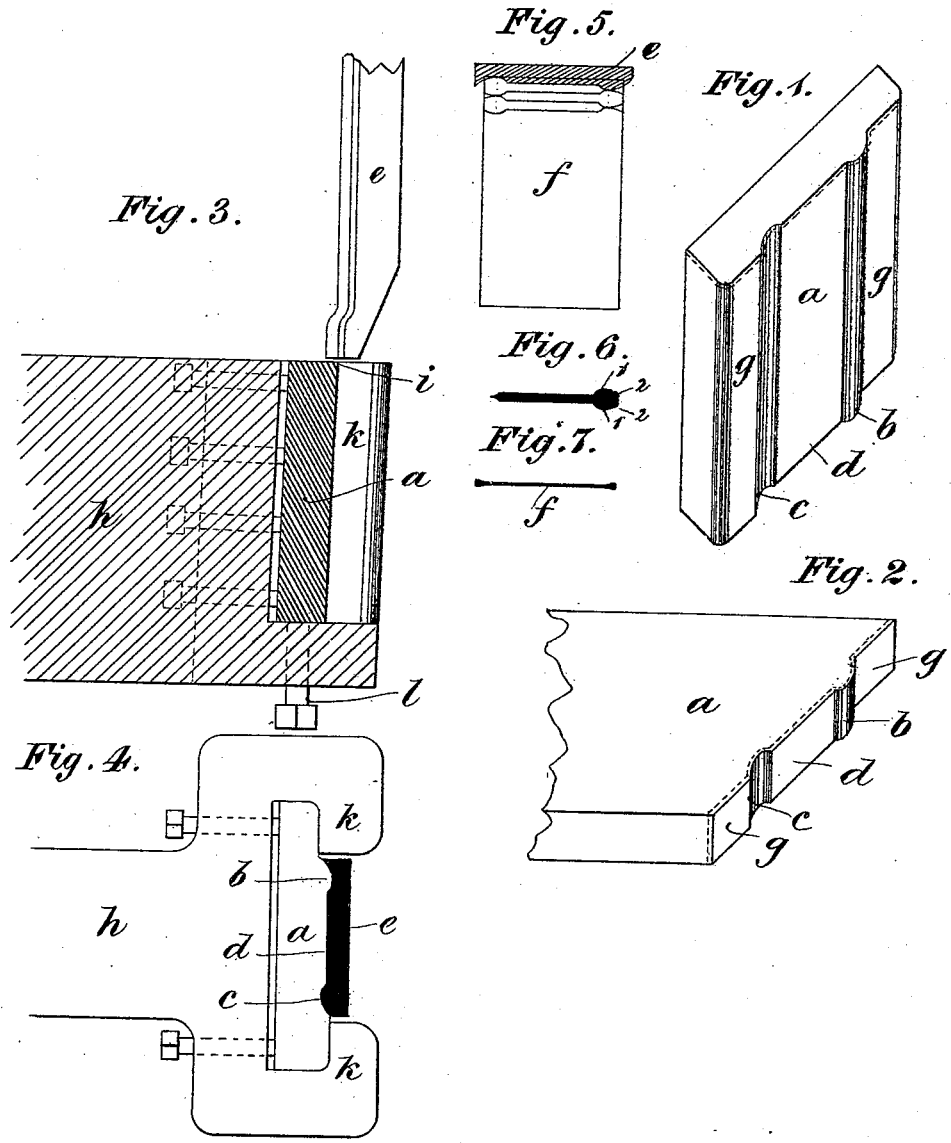
Witnesses.
Charles G. Simpson
E. L. Stilwell.
Inventor,
Geo. P. Clapp

UNITED STATES PATENT OFFICE.

GEORGE P. CLAPP, OF MONTREAL, QUEBEC, CANADA, ASSIGNOR TO JOHN ALEXANDER PILLOW AND RANDOLPH HERSEY, OF SAME PLACE.

IMPROVEMENT IN NAIL-PLATE CUTTERS.

Specification forming part of Letters Patent No. 180,324, dated July 25, 1876; application filed June 19, 1876.

*To all whom it may concern:*

Be it known that I, GEORGE PARKER CLAPP, of the city and district of Montreal, in the Province of Quebec, Canada, have invented certain new and useful Improvements in Nail-Plate Cutters; and I do hereby declare that the following is a full, clear, and exact description of the same.

This invention has reference to a new form of cutter for cutting horseshoe-nails from plates of iron or steel, rolled to a new configuration to suit the purpose.

By my improved form of cutters taper-headed nails are formed by shearing or cutting with cutters nearer the desired shape of tapered head than by any other cutters at present in use.

I would here explain that horseshoe-nails are made sometimes with square-sided heads, and sometimes with heads tapered on their sides. These latter, as far as my knowledge goes, have hitherto been cut square, by shearing from the end of a plate, and by after-working are made taper, whereas, by my invention, the nails are at once cut by shearing from the end of a plate with tapered sides to the head.

I am aware that taper-headed horseshoe-nails have been made at once by punching with a punch-die and matrical bed-die; but as, in this case, they cannot be made perfect, if cut adjacent to each other, or by cutting off the end of the nail-plate, a piece of waste or scrap-iron is made for each nail, so that the scrap is in excess of the produce.

My invention also consists in a new form or construction of the bed-cutter, by which the great trouble of grinding the cutter, when its shape is peculiar, is obviated. With cutters having complicated forms, although the grinding is done with great care, it is found, in practice, impossible to give the cutter the exact same configuration, and, consequently, a difference in the form of nails, and imperfect cutting of them, is the result, while, by my construction of the bed-cutter, the form once given remains the same, and the grinding required for sharpening it is only plain flat grinding, similar to, or requiring less care than for, a plain straight-ended bed-cutter.

In the drawings hereto annexed, similar letters of reference indicate like parts.

Figure 1 is a view of my improved bed-cutter. Fig. 2 is a modification of Fig. 1. Fig. 3 is a central vertical section of bed-cutter arranged in bed, with movable cutter to correspond. Fig. 4 is a plan of Fig. 3. Fig. 5 is a plan, showing upper movable die and its cuts upon the nail-plate. Fig. 6 is a plan of nail produced. Fig. 7 is a cross-section of nail-plate.

Letter $a$ is my improved bed-cutter, having the curved projection or bead $b$ and recess or concave groove $c$, with the intervening flat surface $d$. This bead, groove, and flat surface, as shown in Figs. 1 and 2, may be either formed on the side of the cutter $a$, or on its end, the upper or moving cutter $e$ being made with a bead and groove to correspond, as shown clearly in Fig. 4, with those of the bed-cutter. In Fig. 5, $f$ is the nail-plate, with the plan of the cutter $e$ shown, by being section-lined and placed upon the end of the plate, thereby delineating the waste cut off at the first cut. After this the nail-plate is turned over, giving the cut shown by the lines drawn in this figure.

It will be observed that the cutter $e$ is preferably made somewhat wider than the plate $f$. This is not absolutely necessary if the plate is of uniform width, which should be the case; otherwise the form of the nails will not be quite perfect. If the cutter $a$ is made as shown in Fig. 2, it and the cutter $e$ will be set in the bed-cutter rest and head of a nail-cutting machine of ordinary construction, and operated in the ordinary manner for making common cut-nails, provided with an ordinary and suitable stop for gaging the feed of the plate into the cutters, and a side stop for guiding its position laterally.

By making the plate $f$ of the cross-section shown in Fig. 7—that is to say, with the corrugation on both sides—no matter which side of the plate is uppermost, the cutters have an equal configuration of plate to act upon.

I now come to the latter part of my invention—that is, the improvement in the bed-cutter, whereby the difficulty of grinding it to the desired shape, if made in the form shown in Fig. 2, is obviated.

It is clearly apparent that when the cutter $a$ is made in this form, to sharpen it from time to time is inevitable from use. It can only be done upon a grindstone or emery-wheel, turned with a groove and ridge to agree with the form of the shapes $c\ b$ and $d\ g\ g$, or by softening the cutter and shaping it down and then rehardening it, both of which operations require skill, care, and considerable time; and, even with all these, great exactness cannot be had at all times, as the groove $c$ must be deepened, while the bead $b$ and flat surfaces $d\ g\ g$ must be also reduced to all agree as before, as indicated by the dotted line in Fig. 2.

In my cutter I make the groove $c$, bead $b$, and surfaces $d\ g\ g$ on the side of the cutter $a$, as shown in Fig. 1, which will be easily accomplished with the assistance of the shaping and planing machines, and other tools in ordinary use for similar purposes.

For the purpose of showing how this cutter may be used, I have delineated in Figs. 3 and 4 a rest, $h$, suitable for holding it in a nearly vertical position. This rest is situated in the ordinary cutting-machine in such a manner that when the cutter $a$ is in place its edge $i$ will come to the same position with the cutter $e$ that the edge of the ordinary cutter will do. The surfaces $g$ come to a fair bearing on the surfaces of the jaws $k$, and they may be supported on the back by set-screws or any similar device.

The cutter $a$ is set as much off the plumb as is necessary to give the desired amount of clearance, which would be given by the reducing away of the under side of the cutter $a$ in Fig. 2.

When this cutter $a$, Fig. 1, requires to be sharpened, it is only necessary to remove it from the rest, and grind off the end of it a flat slice, as indicated by the dotted line in Fig. 1.

It is evident that if a slight unevenness should occur, it is not as detrimental as in a pair of common plain-edged cutters for ordinary shearing; nevertheless, it is best to take ordinary care, and have the end ground off with some degree of equality. In grinding the end of the cutter $a$, as last above mentioned, it is not ground at right angles. The cutter being set at the desired angle, its upper surface will be ground so that when the cutter is in place its upper surface will be horizontal, and as the cutter is reduced in length, it is set up to the desired position by any suitable means, such as a number of set-screws, $l$.

This principle of constructing and using the cutter is not only applicable to cutters of the exact form shown, but will also be equally effective and advantageous in any others having peculiar formation of cutting-edge, and also, to some extent, in plain straight-edged cutters.

What I claim is as follows:

The cutter $a$, in combination with the cutter $e$, having corresponding configuration, substantially as and for the purposes described.

Montreal, 15th day of June, A. D. 1876.

GEO. P. CLAPP.

Witnesses:
CHARLES G. C. SIMPSON,
E. L. STILWELL.